United States Patent [19]

Suzuki et al.

[11] 4,076,392
[45] Feb. 28, 1978

[54] REMOTELY CONTROLLABLE REAR VIEW MIRROR

[75] Inventors: Toshiyuki Suzuki, Yaizu; Fumio Yamauchi, Shizuoka, both of Japan

[73] Assignee: Murakami Kaimedio Co., Ltd., Japan

[21] Appl. No.: 692,086

[22] Filed: Jun. 2, 1976

[30] Foreign Application Priority Data

Nov. 26, 1975  Japan ............. 50-160697[U]

[51] Int. Cl.² ............. G02B 5/08; A47G 1/24
[52] U.S. Cl. ............. 350/289; 248/475 B; 248/481; 248/487
[58] Field of Search ............. 350/289, 302, 307; 248/477–484, 475 B, 487; 74/501 M, 491, 471 XY

[56] References Cited

U.S. PATENT DOCUMENTS

| | | |
|---|---|---|
| 3,027,807 | 4/1962 | Barcus et al. ............. 350/289 |
| 3,492,065 | 1/1970 | Kurz ............. 350/289 |
| 3,609,014 | 9/1971 | Kurz ............. 350/289 |
| 3,972,597 | 8/1976 | Repay et al. ............. 350/289 |

*Primary Examiner*—Jon W. Henry
*Attorney, Agent, or Firm*—Beveridge, DeGrandi, Kline & Lunsford

[57] ABSTRACT

In an automatically swingable compact rear view mirror carried by a universal pivotal center support within a hood, a drive motor electrically connected to a given remote control equipment for the driver includes an output shaft which extends, on the side opposite to the end opening of said hood which said mirror faces, substantially parallel to the axial direction of a mechanism for moving a universal pivot coupled to the mirror for free swinging of the latter about the center support. Preferably a pair of universal pivots may be provided on the mirror defining a center angle of approximately 90° with respect to the center support.

6 Claims, 4 Drawing Figures

U.S. Patent   Feb. 28, 1978   4,076,392
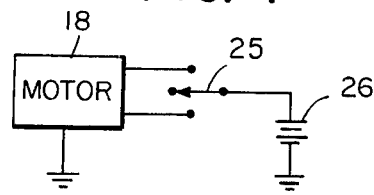
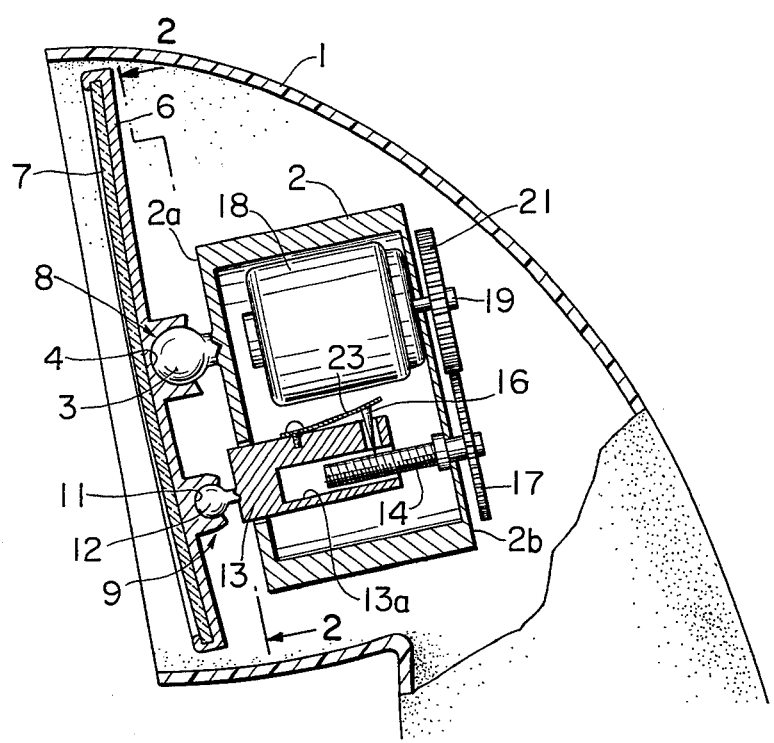
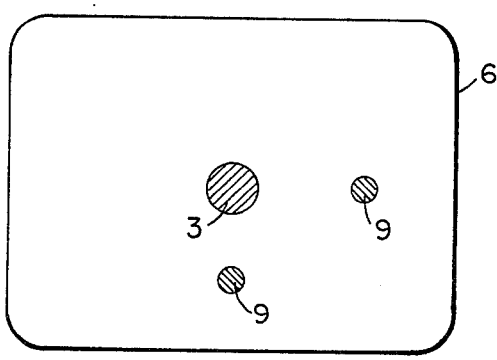
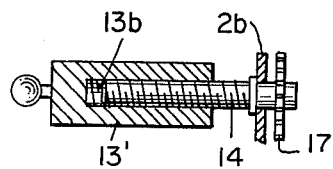

REMOTELY CONTROLLABLE REAR VIEW MIRROR

BACKGROUND OF THE INVENTION

The present invention relates to a remote controllable rear view mirror, and more particularly relates to a rear view mirror of a very compact construction and swingable in desired directions through electric remote control by the driver of vehicles.

With recent rapid development of traffic by vehicles, the number of vehicles on streets has increased enormously and the running speed of vehicles has escalated remarkably. Such crowdedness in traffic accompanied with escalation in the running speed naturally requires appropriately controlled rear side view for the drivers. Particularly, it is strongly preferred that such control of the rear side view be achieved even during running of vehicles.

A proposal has been made in order to satisfy the above-mentioned requirement. An electric type remotely controllable rear view mirror in accordance this proposal includes a pair of drive motors encased within a mirror hood, each drive motor having an output shaft coupled to an externally threaded shaft. This latter shaft is coupled to the mirror via a female thread in screw engagement with the outer thread of the shaft.

The rear view mirror of the above-described construction has the disadvantage that a relatively large construction is required for the mirror hood. This lack in compactness is caused by the fact that the output shaft of the drive motor extends on the side of the universal pivotal center support for the mirror and, due to this arrangement, it is necessary to leave a relatively large space between the drive motor and the mirror.

SUMMARY OF THE INVENTION

It is the object of the present invention to provide a remotely controllable rear view mirror for vehicles of a remarkably compact construction.

In accordance with the present invention, a drive motor, electrically connected to a remote control operated by the driver, includes an output shaft which extends on the side opposite to the end opening of the mirror hood which the mirror faces. Rotation of the output shaft is converted into axial movement of a universal pivot to which the drive motor is connected in order to cause swinging of the mirror about a universal pivotal center support.

In a preferred embodiment of the present invention, a pair of universal pivots may be provided on the mirror while defining a center angle of approximately 90° with respect to the center support.

BRIEF DESCRIPTION OF THE DRAWINGS

Further features and advantages of the present invention will be made clearer from the following description, reference being made to the embodiment shown in the accompanying drawing.

In the drawings:

FIG. 1 is a fragmentary sectional view of a remotely controllable rear view mirror in accordance with the present invention;

FIG. 2 is a fragmentary sectional view taken along line 2—2 of FIG. 1;

FIG. 3 is a fragmentary sectional view illustrating an alternative embodiment of a remotely controllable rear view mirror in accordance with the present invention; and FIG. 4 is a block diagram of control circuitry suitable for incorporation into a remotely controllable rear view mirror in accordance with the present invention.

DESCRIPTION OF THE PREFERRED EMBODIMENT

The principal embodiment of the rear view mirror in accordance with the present invention is shown in the attached drawing. FIG. 1 depicts a cylindrical hollow casing 2 fixedly mounted within a mirror hood 1 in a known suitable manner not shown in the drawing. On the open side of the mirror hood 1, this casing 2 is externally provided with a ball 3 which is received within a center spherical seat 4 formed on the back side of a supporting plate 6 for a rear view mirror 7. This combination of the ball 3 with the seat 4 clearly forms an universal pivotal support 8. Thus, the rear view mirror 7 is carried by the casing 2 in a universally turnable fashion.

As seen in FIG. 2, the supporting plate 6 is further provided with a pair of universal pivots 9 of like construction. The pair of universal pivots 9 are so arranged that they form a center angle of about 90° with respect to the central pivotal support 8. It is preferable that one of the universal pivots 9 assumes a position which is in vertical alignment with that of the center pivotal support 8. In the case of the illustrated embodiment, the one universal pivot 9 is located just below the central pivotal support 8 and the other universal pivot 9 is located on the right lateral side of the central pivotal support 8. Each universal pivot 9 is given in the form of a combination of a spherical seat 11 with a ball 12.

On the side of casing 2, a block 13 is carried by the end wall 2a in axially slidable fashion and externally carries the ball 12 of the universal pivot 9. The opposite end wall 2b of the casing 2 fixedly carries a pin 14 whose inner extension is received in an axial bore 13a of the block 13 and provided with an outer thread. A needle 16 is disposed in the block 13 with its point being projected into the bore 13a and in engagement with the outer thread of the pin 14.

As an alternative, depicted in FIG. 3, the block 13' may be provided with an inner thread in the bore 13b in screw engagement with the outer thread of the pin 14.

On the outer side of the end wall 2b, the pin 14 fixedly carries a gear 17.

A drive motor 18 is fixedly encased within the casing 2 and its shaft 19 extends outwardly through the end wall 2b and, on the outer side of the casing 2, fixedly carries a gear 21 which is in meshing engagement with the gear 17 on the pin 14. Needless to say, the shaft 19 extends substantially parallel to the pin 14.

As depicted in FIG. 4, the drive motor 18 is electrically connected to a remote control mechanism 25, which provides appropriate power from an electrical supply 26 to motor 18, to be operated by the driver.

The above-described construction is similar for each universal pivot 9.

As the remote control equipment is operated by the driver so that the drive motor 18 is activated for rotation of its shaft 19 in one direction, this rotation is transmitted to the pin 14 via the gears 21 and 17 and the pin 14 rotates in one direction which is opposite to that of the shaft 19. This rotation of the pin 14 induces axial displacement of the block 13 due to the engagement of the needle 16 with the thread of the pin 14 or due to the screw engagement between the block 13 and the pin 14. Thus the block 13 moves, for example, projecting out of the casing 2 in order to shove the lower half of the mirror 7 via the universal pivot 9 and the mirror 7 assumes less tilting disposition.

When the drive motor 18 is so activated that the shaft 19 rotates in the other direction, the pin 14 rotates in the other direction, the block 13 recedes into the casing 2, and the mirror 7 assumes a more tilting disposition.

Thus, when the drive motor 18 relating to the universal pivot 9 below the center support 8 is activated, the mirror 7 swings in the vertical direction about the center support 8 whereas, when the drive motor relating to the universal pivot sideways of the center support 8 is activated, the mirror 7 swings in the horizontal direction about the center support 8. When the drive motors are both activated simultaneously, the mirror 7 can swing in any desired direction.

In accordance with the above-described construction, needle 16 may be attached to the block 13, for example by a leaf spring 23 fixed to the block 13 at one end thereof via, e.g. a set screw, which urges at the other end thereof the needle 16 into engagement with the pin 14. With this construction, the block 13 shifts in axial direction when the drive motor 18 rotates, but when any excessive external force is applied to the rear view mirror 7, the needle 16 moves, passing over the thread on the pin 14, and the block 13 moves in axial direction, thereby fascilitating manual adjustment of the angle of the rear view mirror 7.

In accordance with the requirement in actual use, one of the universal pivots and its associated arrangement may be omitted. In such a case, the mirror can swing in one of the vertical and horizontal directions only.

In accordance with the present invention, the output shaft or shafts of the drive motor or motors extends or extend on the side opposite to the mirror and this particular arrangement of the drive motor output shafts results in optimum compactness of the rear view mirror.

What is claimed is:

1. A remotely controlled rear view mirror comprising, in combination, a mirror hood; a hollow casing fixed in said mirror hood and having a universal pivotal support on the outer surface thereof on the hood opening side; a rear view mirror within said mirror hood, facing the opening of said mirror hood, and carried by said universal pivotal support; a drive motor having electrically connected thereto a remote control device for operation by a driver, said drive motor fixed within said casing and including an output shaft extending in a direction opposite to said hood opening side; a block disposed within said casing in an axially movable arrangement with its axis of movement parallel to said output shaft; a universal pivot attached to said block and in engagement with said rear view mirror; a pin coupled to said block; a first gear fixedly carried by said pin; a second gear fixed to said output shaft and engaging said first gear; and means for converting rotation of said pin to axial movement of said block; whereby upon activation of said drive motor, said mirror is swung by said universal pivot about said universal pivotal support.

2. A rear view mirror as claimed in claim 1 in which said universal pivotal support is a combination of a ball fixed to said casing and a spherical seat provided on the surface of said rear view mirror opposite to the hood opening side.

3. A rear view mirror as claimed in claim 1 in which two universal pivots are provided, with the locations of said two universal pivots on said rear view mirror defining a center angle of approximately 90° with respect to said universal pivotal support.

4. A rear view mirror as claimed in claim 1 in which said converting means includes an outer thread formed on said pin and a needle whose point projects in engagement with said outer thread of said pin.

5. A rear view mirror as claimed in claim 4 in which said needle is urged to a pressure contact with said outer thread of said pin by a spring disposed in said block.

6. A rear view mirror as claimed in claim 9 in which said converting means includes an outer thread formed on said pin and an inner thread formed on said block and in screw engagement with said outer thread of said pin.

* * * * *

UNITED STATES PATENT OFFICE
CERTIFICATE OF CORRECTION

PATENT NO. : 4,076,392
DATED : February 28, 1978
INVENTOR(S) : TOSHIYUKI SUZUKI and FUMIO YAMAUCHI It is certified that error appears in the above-identified patent and that said Letters Patent are hereby corrected as shown below:

Change the designation of the Assignee from "Murakami Kaimedio Co., Ltd." to --Murakami Kaimeido Co., Ltd.--

Signed and Sealed this

Twenty-seventh Day of June 1978

[SEAL]

Attest:

RUTH C. MASON
Attesting Officer

DONALD W. BANNER
Commissioner of Patents and Trademarks